2,766,236
PREPARING N-THIOAMINES

Marion W. Harman, Nitro, W. Va., assignor to Monsanto Chemical Company, St. Louis, Mo., a corporation of Delaware No Drawing. Application February 25, 1954, Serial No. 412,667

4 Claims. (Cl. 260—247.1)

This invention relates to the preparation of N-thioamines and pertains particularly to a new method of reacting sulfur monochloride with an amine. Heretofore no satisfactory method which avoids recovery of by-product amine salt has been available for reacting azines by which are meant in particular morpholine, piperidine, piperazine and their hydrocarbon substitution products wherein at least one secondary amino group remains.

An objective of the invention is to provide a method suitable for the commercial preparation of N-thioamines. The classical method of reacting a large excess of the amine in an organic solvent is totally unsuitable for commercial use because half of the expensive amine is consumed in forming by-product salt. An aqueous reaction medium would be advantageous but results in low yields. Careful stirring in an immiscible solvent in the presence of an aqueous caustic layer to effect neutralization at the interface has been proposed but is inconvenient for commercial use and results in low yields from azines. The relatively poor results are illustrated by the following reaction:

A solution of 87 grams (1 mole) of morpholine in 300 grams of heptane and 120 grams (1.5 moles) of 50% sodium hydroxide solution were placed in a 1 liter, 3-necked flask provided with a sealed stirrer, thermometer, reflux condenser, dropping funnel and cooling bath. A solution of 70 grams (0.518 mole) of sulfur monochloride dissolved in 70 grams of heptane was added gradually over a period of 1⅔ hours while keeping the temperature of the reaction mixture at 0°–10° C. The crystalline solid which formed had a tendency to cake on the walls of the flask. After the addition of the sulfur chloride the temperature was permitted to rise to 20° C. After 1 hour 200 ml. of water was added, stirring continued for a short time and the crystalline product removed by filtration, washed with water until free of chlorides and dried. A 63.8% yield of N,N'-dithiobis morpholine was obtained.

It was suspected that the presence of strong alkali even as an immiscible layer might be detrimental and such proved to be the case. Moreover, neutralization in the presence of sulfur chloride gave even poorer results. For example, only a 25.9% yield of poor quality N,N'-dithiobis morpholine resulted from gradually adding the aforesaid sulfur monochloride solution to the morpholine solution at 0°–10° C. according to the above described procedure but in the absence of an aqueous sodium hydroxide layer and then gradually adding the sodium hydroxide solution at 5°–15° C.

On the other hand, excellent results were obtained by avoiding a substantial excess of both neutralizing agent and sulfur chloride. Preferably, the initial reaction is effected as usual in an organic solvent inert to the sulfur halide but only half the theoretical quantity of sulfur monochloride required to convert all of the amine to an N-thioamine is added. Thus the reaction at this stage is actually at the end point of the reaction by the classical method, half of the amine being converted to the hydrochloride. The latter is then neutralized and the remainder of the sulfur monochloride added while neutralizing the amine hydrochloride as rapidly as it forms. Neutralization of the hydrochloride is conveniently effected by a concentrated aqueous solution of potassium or sodium hydroxide, only a sufficient quantity being added to bring the reaction mixture to the neutral point. Additional neutralizing agent is then added concurrently with the sulfur monochloride during the last stage in the recation. Alternatively, the entire reaction may be effected by neutralizing the amine hydrochloride as rapidly as it forms but it is important to keep the sulfur chloride reaction slightly ahead of the neutralizing reaction and for this reason the technique is less desirable because very careful control is required throughout instead of only during the second half as in the preferred procedure.

The process gives excellent results with a large number of amines and so far as is known is operable with any amine capable of forming an N-thioamine by reaction with sulfur monochloride. Examples of other amines suitable for use in the new process are N-alkyl aryl amines such as N-methyl aniline, N-ethyl aniline; dialkyl amines as for example dimethylamine, diethylamine, diisopropylamine, di-n-propylamine, dibutylamine, diisobutylamine, diamylamine, dihexylamine, diheptylamine and dioctylamine; dialicyclic amines as for example dicyclohexylamine, ditetrahydrofurylamine; di-substituted alkyl amines as for example diphenethylamine, dibenzylamine, ditetrahydrofurfurylamine, dibeta-cyanoethylamine and ditetrahydrothenylamine; mixed alkyl alicyclic amines as for example N-methyl cyclohexylamine, N-ethyl cyclohexylamine; alkyl substituted alkyl amines as for example ethylaminoacetonitrile, ethylaminopropionitrile, isopropylaminopropionitrile, octylaminopropionitrile, N-methyl tetrahydrofurfurylamine, N-ethyl tetrahydrofurfurylamine, N-isopropyl tetrahydrofurfurylamine, N-butyl tetrahydrofurfurylamine, N-ethyl tetrahydrothenylamine, and N-isopropyl tetrahydrothenylamine; alicyclic substituted alkyl amines as for example N-cyclohexyl tetrahydrofurfurylamine, N-cyclohexyl tetrahydrothenylamine, cyclohexylaminoacetonitrile and beta-cyclohexylaminopropionitrile.

The reaction between amines and sulfur chlorides is usually very rapid, no heating being required, although if desired the reactions may be carried out at slightly elevated temperatures. The optimum temperature will of course depend upon the particular amine and higher temperatures tend to promote the formation of by-products. In general reaction temperature within the range of 0–60° C. is satisfactory.

An advantage of the process is that carefully controlled agitation to avoid substantial mixing, required in the presence of excess strong alkali, is unnecessary. Efficient stirring throughout the course of the reaction promotes the desired result. Neutralization of the amine hydrochloride formed in the organic solvent is effected by contact with an aqueous inorganic base which latter is immiscible with the organic layer so that vigorous agitation is required to effect neutralization. Agitation is a significant variable affecting the yields obtained and it will be understood that in the detailed examples following efficient vigorous agitation was maintained throughout the entire course of the reactions.

The organic solvent medium may be selected from those solvents which are inert to sulfur monochloride, as for example hexane, heptane, cyclohexane, gasoline, benzene, toluene, xylene, ether, chlor benzene carbon tetrachloride chloroform and trichlor ethylene.

The invention will be more fully understood from the many detailed examples listed below which explain how the steps in the process are carried out and show the advantages obtained.

Example I

Substantially 174 parts by weight of morpholine (two molecular proportions) were dissolved in 550 parts by weight of heptane and the solution cooled below 8° C. A solution of 67.5 parts by weight of sulfur monochloride (one-half molecular proportion) in 69 parts by weight of heptane were added gradually thereto over a period of about 62 minutes while keeping the temperature of the reaction mixture at 0-8° C. The reaction mass was stirred vigorously throughout. At this point 160 parts by weight of a 25% aqueous solution of caustic soda (1 molecular proportion) were added while continuing the stirring. This was followed by a second gradual addition of 67.5 parts by eight of sulfur monochloride in 69 parts by weight of heptane and concurrently therewith 160 parts by weight of 25% aqeuous caustic soda were added, about 66 mintues being required for the addition. 500 parts by weight of water were then added to dissolve the salt and the product isolated by filtration from the heptane in which it is substantially insoluble. An 87% yield of N,N'-dithio-bis-morpholine having a melting point of 124-125° C. was obtained. Analysis for sulfur and nitrogen gave 26.7% and 11.6% respectively as compared to the calculated values of 27.13% and 11.85%.

Replacement of the heptane by trichlor ethylene gave substantially the same yield. However, the product is soluble in this solvent and its isolation and purification is more difficult, the crude product being yellow soft crystals. In general the preparation of N-thioamines which are crystalline materials is advantageously carried out in solvents in which they are virtually insoluble.

Two molecular proportions of 2,6-dimethyl morpholine was substituted for morpholine in the procedure described above to obtain N,N'-dithiobis 2,6-dimethyl morpholine, an amber oil, in excellent yield.

*Example 2*

Substantially 697 parts by weight of morpholine were dissolved in 3000 parts by weight of a hydrocarbon fraction B. P. 156-207° C. corresponding essentially to decane and to the solution was added 2 parts by weight of a surface active agent obtained by condensing tall oil or dodecyl mercaptan with ethylene oxide. The mixture was cooled to 0° C. and 270 parts by weight of sulfur monochloride fed in at a rate of 2-3 parts by weight per minute so that the temperature did not exceed 25-30° C. The mixture was stirred for about an hour after the addition of the sulfur monochloride during which time it was again cooled to about 0° C. and 640 parts by weight of 25% caustic soda added as rapidly as possible and the mixture stirred vigorously for 30 minutes. Sulfur monochloride was then fed in at the rate of 2-3 parts by weight per minute. The sulfur monochloride feed was started first and then 25% aqueous caustic soda was fed in concurrently. This is the most critical step of the reaction and the feed rates should be adjusted so that there is always a slight excess of sulfur monochloride. For example, the schedule of addition of caustic corresponding to sulfur monochloride was as follows:

| Sulfur monochloride, Parts by weight Added | 25% Caustic soda, Parts by weight Added |
| --- | --- |
| 6.5 | 10 |
| 40 | 90 |
| 53 | 120 |
| 70 | 160 |
| 95 | 220 |
| 120 | 280 |
| 137 | 320 |
| 150 | 350 |
| 175 | 410 |
| 201 | 470 |
| 226 | 530 |
| 251 | 570 |
| 268 | 630 |
| 269 | 635 |
| 270 | 640 |

The temperature was kept below 30° C. during this addition and then the reaction mixture stirred at 25-30° C. for 30 minutes and the product isolated by filtering, washing with water and drying to obtain an average yield of 84.5% of N,N'-dithiobis morpholine. The reaction was run in the same manner at 60° C to obtain an 85.5% yield.

*Example 3*

Substantially 174 parts by weight of morpholine was dissolved in 772 parts by weight of a hydrocarbon fraction B. P. 156-207° C. corresponding essentially to decane and the solution cooled to 0°-5° C. There was then added gradually 135 parts by weight of sulfur monochloride and concurrently therewith 320 parts by weight of 25% aqueous caustic soda, keeping the sulfur chloride addition slightly ahead of the caustic feed. About 45 minutes were required for the addition. Throughout the temperature was kept at 25-30° C. and the reaction mixture subjected to vigorous stirring. Stirring was continued for 30 minutes after the addition and then 30 minutes more after adding 250 parts by weight of water. The product was filtered from solution, washed with 500 parts by weight of water and dried to obtain N,N'-dithiobis morpholine in a yield of 88.2%.

Other preparations were carried out in exactly the same manner except that the reaction temperature was varied from which it became apparent that the temperature could be increased to 60° C. without substantial affect on the yield:

| Reaction Temperature, ° C. | Yield, Percent of Theory Based on Morpholine |
| --- | --- |
| 40 | 86.5 |
| 50 | 86.5 |
| 60 | 87.8 |
| 70 | 80.5 |

*Example 4*

One molecular proportion of piperidine was dissolved in 400 parts by weight of heptane and one-fourth molecular proportion of sulfur monochloride dissolved in 35 parts by weight of heptane added thereto at 0°-10° C. The by-product hydrogen chloride was then neutralized by adding one-half molecular proportion of sodium hydroxide as a 25% aqueous solution. A second one-fourth molecular proportion of sulfur monochloride was added as before concurrently with another one-half molecular proportion of sodium hydroxide as a 25% aqueous solution. The organic layer was washed with water and the solvent removed by distillation. The residue was heated in vacuo at 95-110° C./5-10 mm. to yield N,N'-dithio bis piperidine, M. P. 61-64° C. in a yield of 90.4% of the theoretical.

The piperidine was replaced by one molecular proportion of alpha pipecoline in the foregoing procedure to obtain N,N'-dithiobis alpha pipecoline as a red oil in substantially quantitative yield.

Replacing piperidine by one molecular proportion of N-phenyl piperazine in the foregoing procedure resulted in a good yield of 1,1'-dithiobis(4-phenyl piperazine). The crude product was a yellow solid, M. P. 100-105° C. which melted at 117-119° C. after recrystallizing from acetone.

*Example 5*

Substantially 57 parts by weight of 2,5-dimethyl piperazine (essentially the trans isomer) was dissolved in 950 parts by weight of trichloroethylene and cooled to 7° C. A solution of 33.7 parts by weight of sulfur monochloride in 73 parts by weight of trichloroethylene was added gradually over a period of about 25 minutes while keeping the temperature of the reaction mixture at 7°-10° C. The reaction mixture was stirred vigorously throughout the addition and for 10 minutes longer at 10° C., then 80 parts by weight of 25% aqueous caustic soda added and the mixture stirred for 20 minutes. Another 37.7 parts by weight of sulfur monochloride in trichloroethylene were added concurrently with 80 parts by weight of 25% aqueous caustic soda at 5°–10° C. over a period of about 25 minutes and stirring continued for 10 minutes. The reaction mixture was then stirred with 250 parts by weight of water for 15 minutes, the solids filtered off, washed with water until the washings were neutral to litmus and dried to yield 59 parts by weight of an N-thioamine having the empirical formula $$C_{12}H_{24}N_4S_4$$

The crude product, M. P. 205–207° C., is pure enough for most purposes. The pure compound melted at 216–218° C.

*Example 6*

Substantially 50 parts by weight of piperazine was dissolved in 950 parts by weight of trichloroethylene and cooled to 10° C. A solution of 39 parts by weight of sulfur monochloride in 73 parts by weight of trichloroehylene was added gradually over a period of about 25 minutes while keeping the temperature of the reaction mixture at 10°–20° C. The reaction mixture was stirred vigorously throughout the addition and for 10 minutes longer at 10° C., then 92.8 parts by weight of 25% aqueous caustic soda added and the mixture stirred for 20 minutes. Another 39 parts by weight of sulfur monochloride in trichloroethylene were added concurrently with 92.8 parts by weight of 25% aqueous caustic soda at 10°–20° C. over a period of about 25 minutes and stirring continued for 10 minutes. The reaction mixture was then stirred with 250 parts by weight of water for 15 minutes, the solids filtered off, washed with water until the washings were neutral to litmus and dried to yield an N-thio piperazine, M. P. 218–221° C., having the empirical formula $C_8H_{16}N_4S_4$ in a yield of 75.6% of the theoretical.

While the invention has been described and explained by reference to specific examples, it is to be understood that it is not limited thereto. Sulfur monobromide is equivalent to sulfur monochloride but the latter is the only sulfur halide of practical significance.

This application is a continuation-in-part of application Serial No. 187,697, filed September 29, 1950 now abandoned.

What is claimed is:

1. The process of preparing N,N'-dithiobis morpholine which comprises reacting at 0° C.–60° C. substantially one-fourth of one molecular proportion of sulfur monochloride with substantially one mloecular proportion of morpholine in a solvent inert to sulfur monochloride in which N,N'-dithiobis morpholine is essentially insoluble, neutralizing the by-product morpholine hydrochloride with a concentrated aqueous solution of an alkali metal hydroxide and then gradually adding sulfur monochloride and alkali metal hydroxide concurrently to complete the conversion while stirring vigorously to effect intimate mixing of the organic and aqueous layers and keeping the sulfur monochloride addition slightly ahead of the alkali addition.

2. The process of preparing N,N'-dithiobis morpholine which comprises gradually adding sulfur monochloride and an alkali metal hydroxide concurrently to morpholine at 0°–60° C. in a solvent inert to sulfur monochloride, keeping the sulfur monochloride addition slightly ahead of the alkali addition and stirring vigorously to effect intimate mixing.

3. The process of preparing N,N'-dithioamines which comprises gradually adding sulfur monochloride and an alkali metal hydroxide concurrently to a secondary amine selected from the group consisting of morpholine, piperidine, piperazine 2,6-dimethyl morpholine, alpha pipecoline, N-phenyl piperazine and 2,5-dimethyl piperazine at 0°–60° C. in a solvent inert to sulfur monochloride, keeping the sulfur monochloride addition slightly ahead of the alkali addition and stirring vigorously to effect intimate mixing.

4. The process of preparing N,N'-dithio-bis-morpholine which comprises reacting at 0° C.–8° C. substantially one-fourth of one molecular proportion of sulfur monochloride with substantially one molecular proportion of morpholine in a solvent inert to sulfur monochloride in which N,N'-dithio-bis-morpholine is essentially insoluble, neutralizing the by-product morpholine hydrochloride with a concentrated aqueous solution of an alkali metal hydroxide and then gradually adding sulfur monochloride and alkali metal hydroxide concurrently to complete the conversion while stirring vigorously to effect intimate mixing of the organic and aqueous layers.

References Cited in the file of this patent

UNITED STATES PATENTS

| 2,417,954 | Sloan | Mar. 25, 1947 |

FOREIGN PATENTS

| 693,180 | France | Nov. 17, 1930 |

OTHER REFERENCES

Rosa: Jour. of the Patent Office Society, vol. 34, pp. 324–345 (1952).